(No Model.) 4 Sheets—Sheet 1.

W. P. ELLIOTT.
PROCESS OF AND APPARATUS FOR THE MANUFACTURE OF GAS.

No. 452,697. Patented May 19, 1891.

WITNESSES:
Jno. Enders Jr.
H. Els. Peck

INVENTOR
W. P. Elliott
per O. Ehluffy
ATTORNEY.

(No Model.) 4 Sheets—Sheet 3.

W. P. ELLIOTT.
PROCESS OF AND APPARATUS FOR THE MANUFACTURE OF GAS.

No. 452,697. Patented May 19, 1891.

(No Model.) 4 Sheets—Sheet 4.

W. P. ELLIOTT.
PROCESS OF AND APPARATUS FOR THE MANUFACTURE OF GAS.

No. 452,697. Patented May 19, 1891.

WITNESSES:
Jno. Enders Jr.
H. E. Peck

INVENTOR
W. P. Elliott
BY O. E. Duffy
ATTORNEY.

UNITED STATES PATENT OFFICE.

WALTER P. ELLIOTT, OF NEW YORK, N. Y.

PROCESS OF AND APPARATUS FOR THE MANUFACTURE OF GAS.

SPECIFICATION forming part of Letters Patent No. 452,697, dated May 19, 1891.

Application filed July 12, 1890. Serial No. 358,532. (No model.)

*To all whom it may concern:*

Be it known that I, WALTER P. ELLIOTT, of New York, in the county and State of New York, have invented certain new and useful Improvements in Process of and Apparatus for the Manufacture of Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the manufacture of illuminating-gas by generating producer gas by means of air passing through anthracite or bituminous coal, peat, coke, slack or culm and mingling the same with a carbureted water-gas generated in an independent furnace and passing the entire product through a series of tubes or retorts which have been previously heated by the combustion of the producer gas from both furnaces; and in carrying out this improved process I provide two generators, the outlet-flue of one of which connects with the upper part of the other, and within this latter a flue or passage leads to a fixing-chamber, wherein the operation of making a fixed illuminating-gas is completed.

Furthermore, my improvements consist in detailed features, which will be fully described, and specifically pointed out in the claims.

Figure 1:
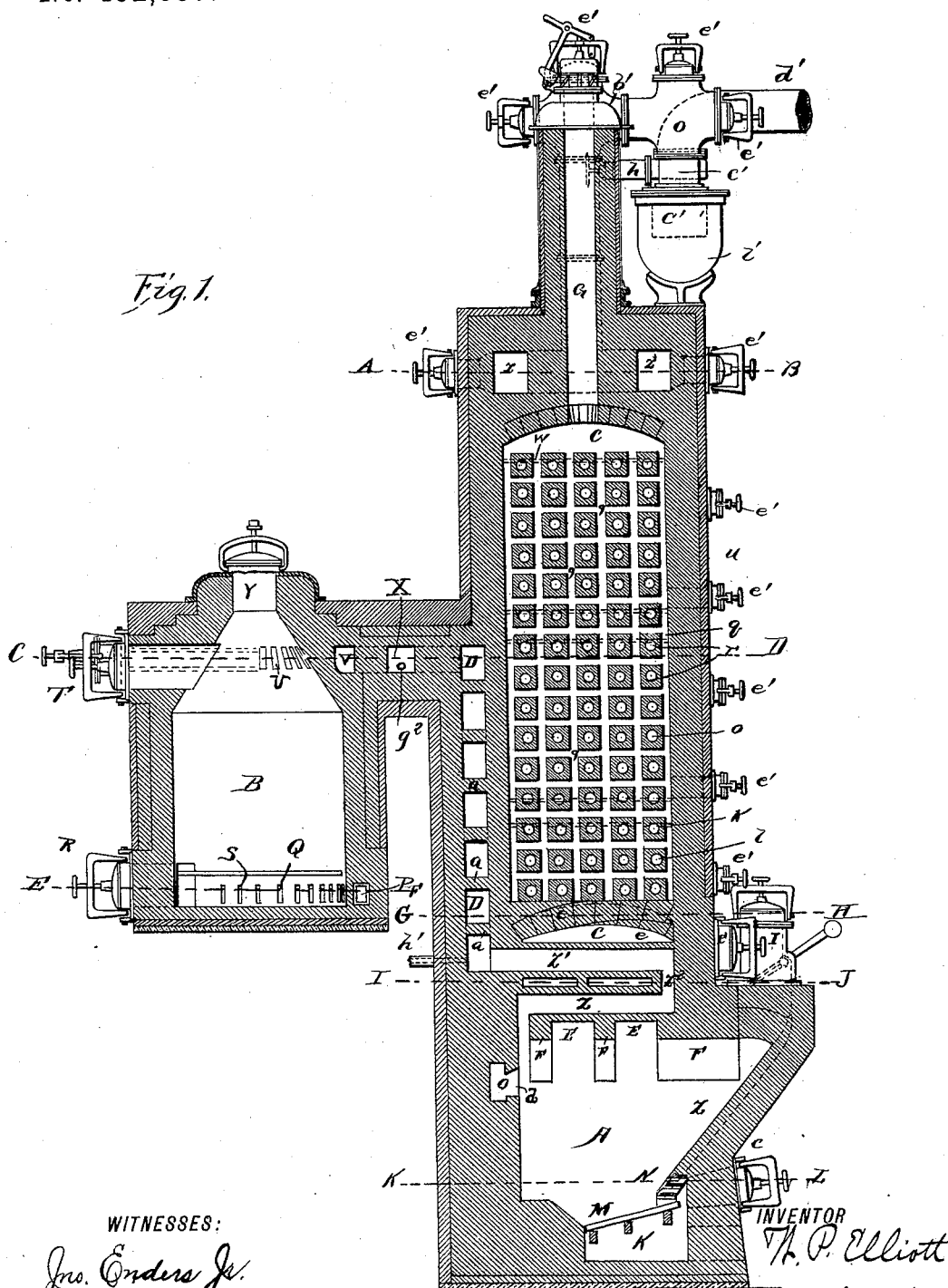
Figure 2:
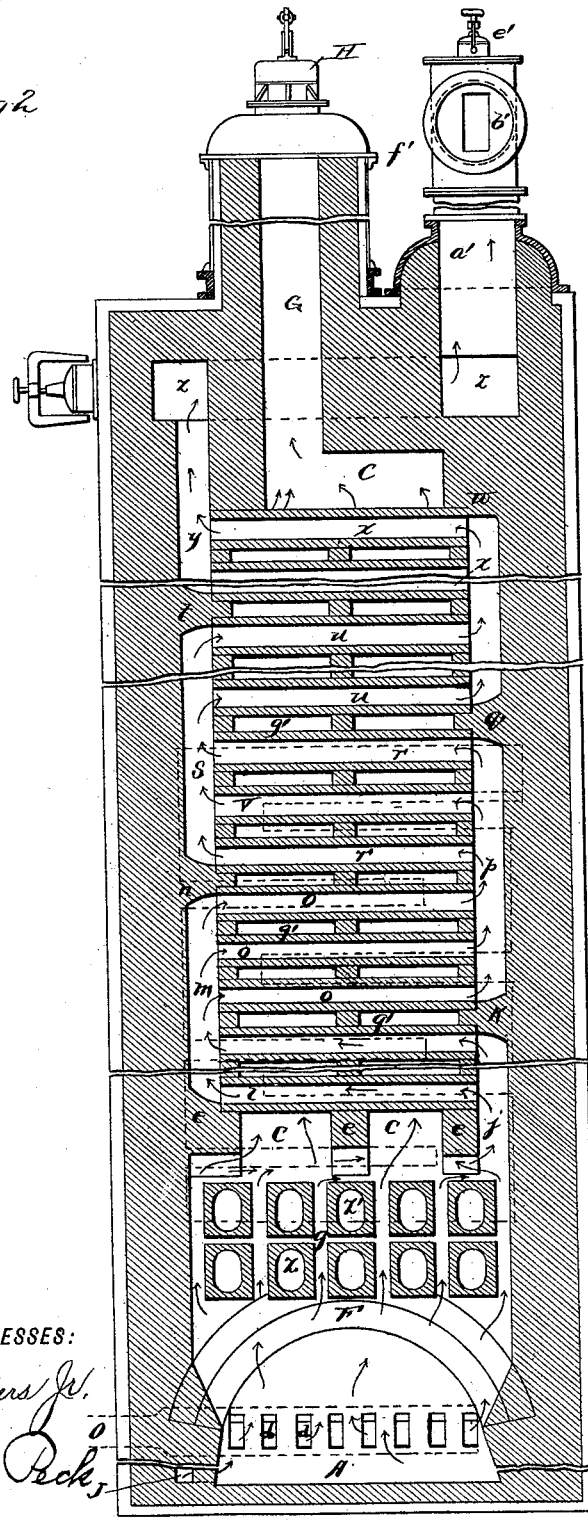
Figure 3:
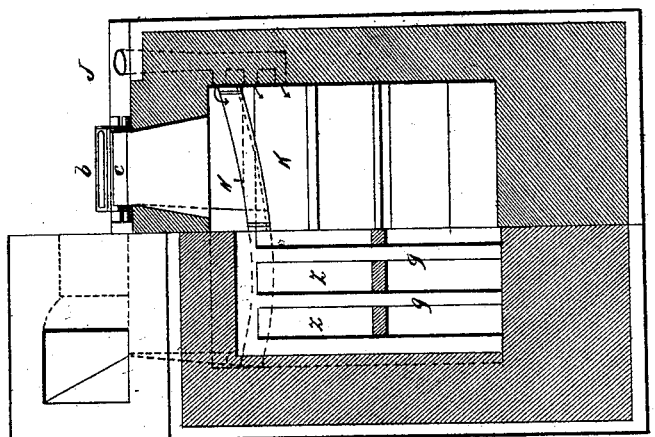
Figure 5:
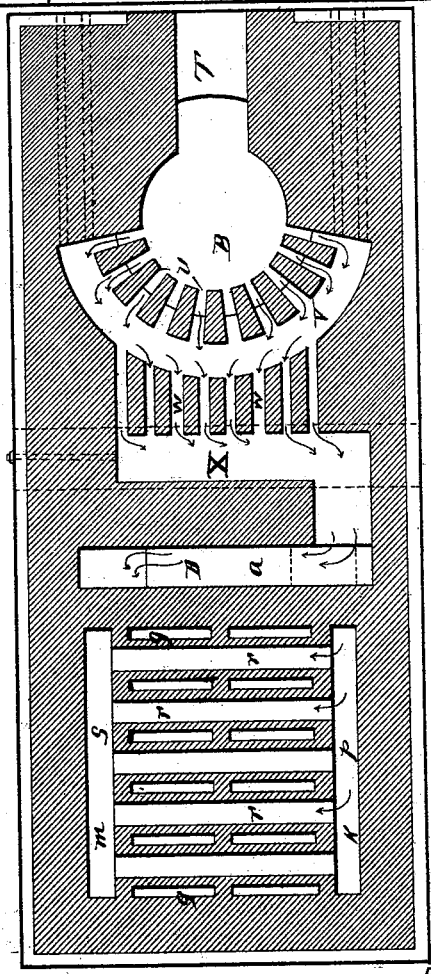
Figure 6:
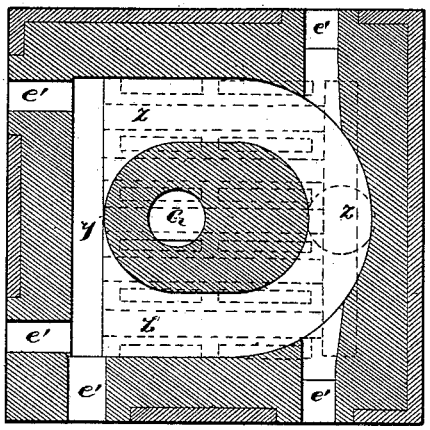
Figure 4:
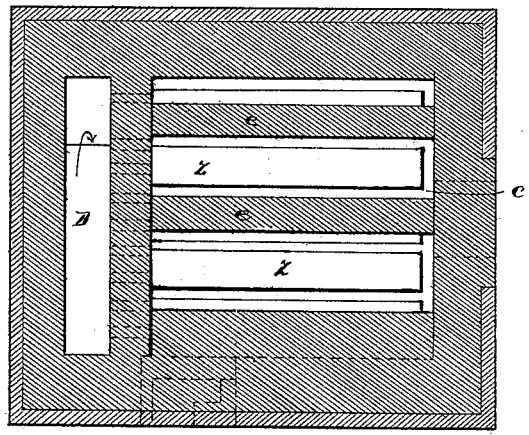
Figure 7:
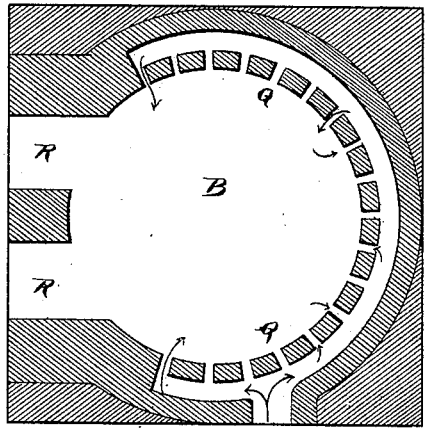

Referring now to the drawings for a detailed description of my invention, Figure 1 is a vertical section through the generators and carbureting-chamber. Fig. 2 is a vertical section taken through the producer and carbureting-chamber at right angles to the plane of Fig. 1. Fig. 3 is a horizontal section taken on the planes of the lines I J and K L, Fig. 1. Fig. 4 is a horizontal section on line G H, Fig. 1. Fig. 5 is a horizontal section on the lines C D, Fig. 1. Fig. 6 is a horizontal section on line A B, Fig. 1. Fig. 7 is a horizontal section on line E F, Fig. 1.

The letter A represents an ordinary form of furnace for the generation of producer-gas, with inclined front wall L, and is provided with a charging-door I, grate-bar M and N, ash-pit K, air-supply passage J, and cleaning-doors $c$ and $b$. Extending transversely across the upper part of the furnace A is a series of arches F, having passages E between them. The upper part of the furnace A below the arches F constitutes a mixing-chamber, wherein the producer gas from said furnace and the gases from generator B are commingled and then passed into the fixing-chamber, as will be more fully hereinafter described. The air-blast may be supplied by means of a blower or steam-injector.

The letter O represents a flue or passage connecting with the air-supply pipe and communicating with the upper part of the producer below the arches F through a series of ports $d$. Immediately above the arches F are tubes Z Z', which connect through the passage $z^2$ at their forward ends. These tubes are so placed as to leave spaces $g$ between, through which pass the gases and products of combustion from furnace A. Above the tube Z Z' and at right angles to the arches F are the arches $e$, which serve as supports for the tubes of the carbureting and fixing chamber C, which occupies the upper part of the cupola. This chamber is filled with a series of tubes or retorts $l$, $o$, $r$, $u$, and $x$ in series of three each, though I do not limit myself to this number. These retorts are of fire-clay or other suitable material and extend widthwise nearly to the walls of the fixing-chamber and are supported the one upon the other by spacing-pieces, leaving intermediate spaces $g'$. Deflecting-walls $k$, $n$, $q$, and $t$ extend from opposite sides of the chamber and serve to direct the course of the gas from the return-chambers $j$, $m$, $p$, $s$, and $y$ into and through the series of retorts, providing thereby a circuitous or zigzag passage for the gas. The escape-flue G for the products of combustion opens through the upper part of the fixing-chamber and is provided with a suitable closing-cap H.

The letter $e'$ represents cleaning-doors, through which access may be had to the interior of the several parts of the plant.

$z$ is a flue or passage communicating with the chamber $y$, which connects with the upper set of carbureting-retorts. The flue $z$ extends through the walls of the fixing-chamber and connects with the stand-pipe $a'$, and this latter, through a pipe $b'$, connects with the dip-pipe $c'$, which extends into the hydraulic main $i$.

The letter $d'$ represents the gas-outlet flue, and through which the gas is carried to the condenser, purifiers, &c. The dip-pipe is provided with a valve $h$, and a steam-pipe $f'$ enters the cross-pipe $b'$ to supply steam for scurfing the carbureting-retorts.

The letter B represents a water-gas generator provided with suitable grate-bars S, charging-door T, stoking-door Y, and cleaning-doors R.

The letter P represents an air-inlet flue extending around the lower walls of the generator and communicating therewith through the ports Q below the grate-bars. The air may be supplied by a blower or other suitable means. The upper wall of the generator is provided with a series of annular outlet ports or channels, which communicate with an annular chamber V, formed in the wall between the generator B and carbureting-chamber C. The annular chamber V in turn communicates through a series of ports W with a chamber X, which latter communicates with the upper part of a flue D, located in the side wall of the carbureting-chamber. This flue D is divided by a series of partition-walls $a$, extending alternately from each side to near the other, thereby providing a circuitous passage for the gas coming from generator B. An oil-supply pipe $g^2$ extends through the wall and discharges into the chamber X. A pipe $h'$ supplies oil to the flue $Z'$. Steam is supplied to the generator B through a pipe which leads into the flue P.

The operation of my apparatus is as follows: A fire is first kindled in the furnace A, which is then charged with bituminous or anthracite coal, coke, slack or culm, peat, shale, or any suitable carbonaceous material through the hopper I and allowed to slide down the inclined face L until the desired depth of fire has been obtained. The cap H being open, a blast of air is admitted through flue J into the ash-pit K. Thence it passes through the spaces between the grate-bars M and N into and through the carbonaceous material, which is raised to a high heat, the gases passing through the spaces E E between the arches F and through the spaces $g$ into chamber C. A fire is then kindled in B, the fuel being introduced through the charging-door T, and a blast of air through the inlet P and ports Q raising the fuel in generator B to a high temperature. The gases pass through the openings U into the annular chamber V, through ports W into chamber X, and thence into and through the flue D, being deflected in their course by the partition-walls $a$. All the chambers and flues through which the hot gases pass are thus highly heated before they pass into and through the flues $Z'$ Z into the upper part of furnace A, when the products are mixed with the gases from said furnace. A supply of air is admitted through the channel O and ports $d$ into the upper part of A, causing combustion of the mixed gases while passing between the arches $e$ and spaces $g'$ about the carbureting-retorts, heating the latter to a temperature sufficient in the after process of making gas to effect a thorough amalgamation of the oil and water gas. The waste products of combustion thence escape into the atmosphere through flue G. When the fuel in generator B has been raised to incandescence, the air-supply is discontinued at P and O, the cap H closed, and the valve $h$ in the pipe $b'$ opened. The air-supply at J is regulated, as desired, sufficient being admitted to keep up the generation of a producer gas in furnace A, and steam admitted and forced through the incandescent fuel in generator B, where it is decomposed with the generation of hydrogen and carbon monoxide. These gases pass through the ports U into the annular chamber V and through ports W into the chamber X, where they meet a current of hydrocarbon oil introduced through pipe $g^2$. Thence the gas and vaporized oil pass together through the flue D, pursuing a circuitous course over and under the partition-walls $a$ through the flues $Z'$ Z into the upper part of furnace A, when they mingle with the producer gas from said furnace. The mixed gases and now thoroughly-vaporized oil pass under the arches $e$ through flue $j$ and, meeting deflector $k$, pass through the retorts $l$ to flue $m$, meeting deflector $n$, thence through retorts $o$ to flue $p$, meeting deflector $q$, thence through retorts $r$ to flue $s$, meeting deflector $t$, through retorts $u$ to flue $v$, meeting deflector $w$, through retorts $x$ to flue $y$ into channel $z$, and thence through stand-pipe $a'$, connecting pipe $b'$ to dip-pipe $c'$ and hydraulic main $i$ to inlet-pipe $d'$, to condenser, scrubbers, and purifiers, as usual. During the passage of the gas and oil vapors through the series of retorts they are subjected to a temperature sufficient to cause a thorough amalgamation of the elements, resulting in a homogeneous and fixed gas suitable for illuminating purposes. If desired, an additional supply of hydrocarbon can be injected through pipe $h'$ into flue $Z'$. When the temperature of the fuel in generator B has been reduced to the extent that steam is not decomposed, or when the retorts are not hot enough to decompose and fix the hydrocarbon vapors in the gas, the steam and oil supply is discontinued, valve $h$ closed, and cap H opened. The operation of blasting is repeated until the fuel is sufficiently regenerated and the retorts heated to the desired temperature, when the operation of making carbureted water-gas is continued, as above described.

It is not essential to my process that the fixing-chamber be located immediately above the furnace A, as it may be placed between said furnace and generator B or otherwise located, provided that the arrangement of connecting flues remain as described; also, the oil may be injected into the tubes or retorts of the fixing-chamber instead of at the points indicated in above.

Having thus fully described my invention, what I claim as new, and desire to secure by Letters Patent, is—

1. The process of manufacturing gas, which consists in blasting two separate beds of fuel with air, burning the combined gaseous products to heat a carbureting or fixing chamber, discontinuing the air-blast to one of the bodies of fuel and injecting steam thereinto, carbureting the resultant water-gas, and passing the same, mingled with the producer gas from the other body of fuel, through the heated fixing-chamber, substantially as described.

2. The mode of manufacturing gas, which consists in generating a producer gas, highly heating a fixing-retort with said gas, generating a carbureted water-gas in an independent generator, and then mingling said producer gas and said carbureted water-gas and passing the same circuitously through said previously-heated chamber, substantially as set forth.

3. In an apparatus for the manufacture of gas, the combination of a producer-gas generator, a second generator provided with a steam-pipe, a mixing-chamber in said producer-gas generator into which the gas from the generator directly passes, a passage from said second generator into said mixing-chamber, said passage passing in proximity to the producer-gas generator and heated thereby, fixing-chamber into and through which the combined gases from said mixing-chamber flow, and an oil-supply pipe, arranged substantially as described.

4. In an apparatus for the manufacture of gas, the combination of the producer-gas generator, the second generator, an air-pipe for the producer-gas generator, and a steam-pipe for the second generator, a mixing-chamber directly in said producer-gas generator and into which the gas therefrom flows, a passage from the second generator into said mixing-chamber, including a series of heating retorts or tubes directly in said generator, an oil-pipe into said passage, and a fixing-chamber into which the combined gases from said mixing-chamber are discharged, substantially as described.

5. In an apparatus for the manufacture of gas, the combination of two independent generators, air and steam pipes therefor, a mixing-chamber in one of said generators into which the gas from the same directly passes, a heated passage from the other generator into said mixing-chamber, an oil-pipe into said passage, and the fixing-chamber consisting of series of tubes or retorts forming a circuitous passage through which the combined gases from said mixing-chamber are passed, substantially as described.

6. In an apparatus for the manufacture of gas, the combination of two generators provided with air-blast and steam pipes, a mixing-chamber in the upper part of one of the generators, a carbureting and fixing chamber formed of a series of tubes or retorts extending widthwise of the chamber, deflecting-walls extending from the walls of the chamber, so as to provide return-chambers and to secure a circuitous passage for the gas, a flue or passage leading from the mixing-chamber to the carbureting-chamber and a flue or passage leading from the other generator to the mixing-chamber, and an oil-supply pipe, substantially as described.

7. In an apparatus for the manufacture of gas, the combination of the two generators provided with air-blast and steam pipes, a mixing-chamber in the upper part of one of the generators, a fixing-chamber communicating by a flue or passage with the mixing-chamber, the second generator provided in its upper wall with a series of outlet-ports communicating with an annular chamber formed in the wall, a second chamber communicating therewith and having an oil-supply pipe, and a chamber located in the wall of the fixing-chamber and having a series of deflecting-partitions therein and communicating with the mixing-chamber of the first-named generator, substantially as described.

In testimony that I claim the foregoing as my own I affix my signature in presence of two witnesses.

WALTER P. ELLIOTT.

Witnesses:
F. T. GROSS,
G. U. GROSS.